United States Patent [19]

Winters

[11] 4,223,966
[45] Sep. 23, 1980

[54] GLASS DISPLAY CASE
[75] Inventor: Albert C. Winters, Mill Neck, N.Y.
[73] Assignee: Manhattan Store Interiors, Inc., Brooklyn, N.Y.
[21] Appl. No.: 44,854
[22] Filed: Jun. 4, 1979
[51] Int. Cl.² .................. A47F 3/06; A47F 3/12; F16B 12/12
[52] U.S. Cl. .................. 312/140; 24/73 PC; 52/285; 108/109; 211/187; 403/175; 403/260; 403/385
[58] Field of Search ............ 312/140, 111, 114, 117; 24/73 PC, 73 PP; 220/22.1, 22.2; 46/31; 403/260, 385, 170, 175, 346; 52/285; 108/109; 211/187

[56] References Cited
U.S. PATENT DOCUMENTS

| 857,230 | 6/1907 | Feinberg | 312/140 |
|---|---|---|---|
| 1,677,544 | 7/1928 | Brainard et al. | 312/117 |
| 2,240,729 | 5/1941 | von Palmenberg | 312/140 |
| 3,717,395 | 2/1973 | Spielvogel et al. | 312/114 |
| 3,913,289 | 10/1975 | Recker | 46/31 |
| 3,955,510 | 5/1976 | Kinik et al. | 403/171 |
| 3,998,002 | 12/1976 | Nathanson | 46/31 |

FOREIGN PATENT DOCUMENTS 1064123  5/1954  France ................ 312/140

Primary Examiner—Francis K. Zugel
Assistant Examiner—Alexander Grosz
Attorney, Agent, or Firm—Allison C. Collard; Thomas M. Galgano

[57] ABSTRACT

An adjustable glass display case, which permits ready assembly and disassembly, is provided which includes a frame having four glass plates, a generally horizontally-disposed top plate, a generally horizontally-disposed base plate and two upstanding, spaced-apart side plates disposed generally between the top and bottom plates. Each of the glass plates has two longitudinally-extending, spaced-apart rows of holes formed therethrough and is detachably secured to the other plates of the frame adjacent thereto. The case also includes a back glass plate disposed adjacent to, and detachably secured to the frame. In addition, at least one vertical glass divider is positioned between and disposed generally parallel to said side plates and is detachably secured to the top plate and bottom plate by a clamping assembly which is at least partially retained within at least one of the holes of the top and bottom plates. At least one glass shelf having opposite lateral edges is disposed between the vertical divider and one of the side plates and is detachably secured therebetween by a bracket assembly which is at least partially retained within at least one of the holes of the side plate and the vertical divider.

6 Claims, 9 Drawing Figures

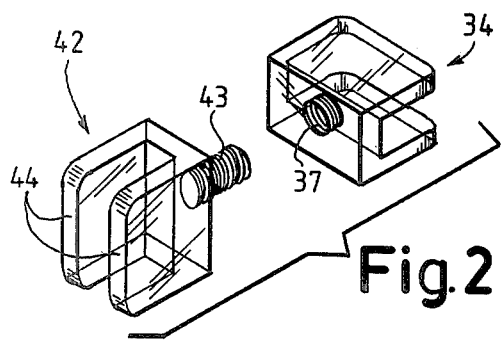
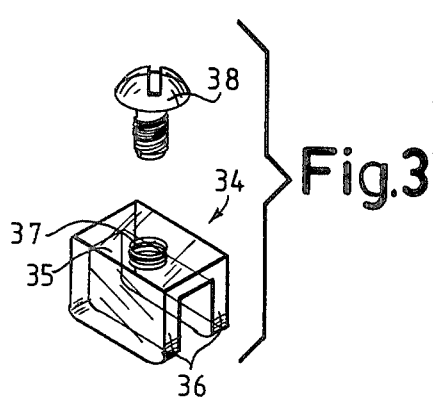
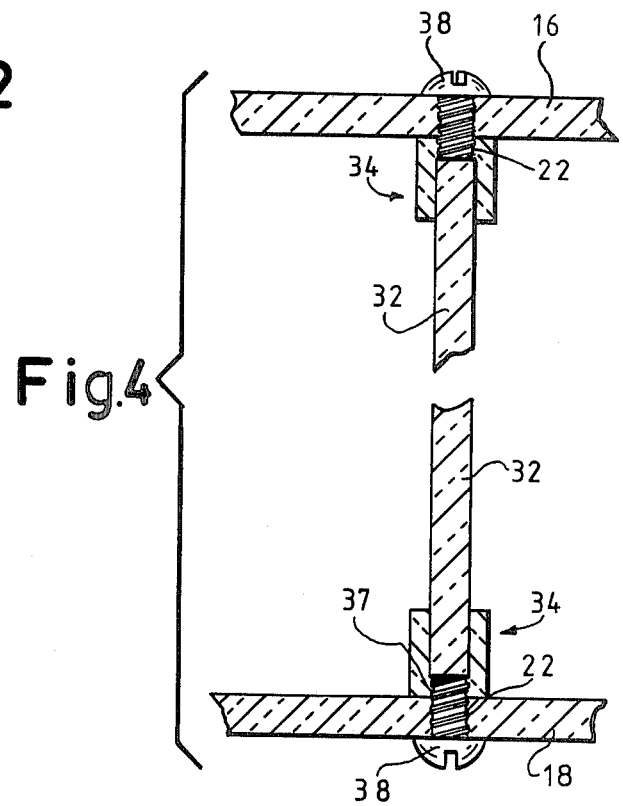
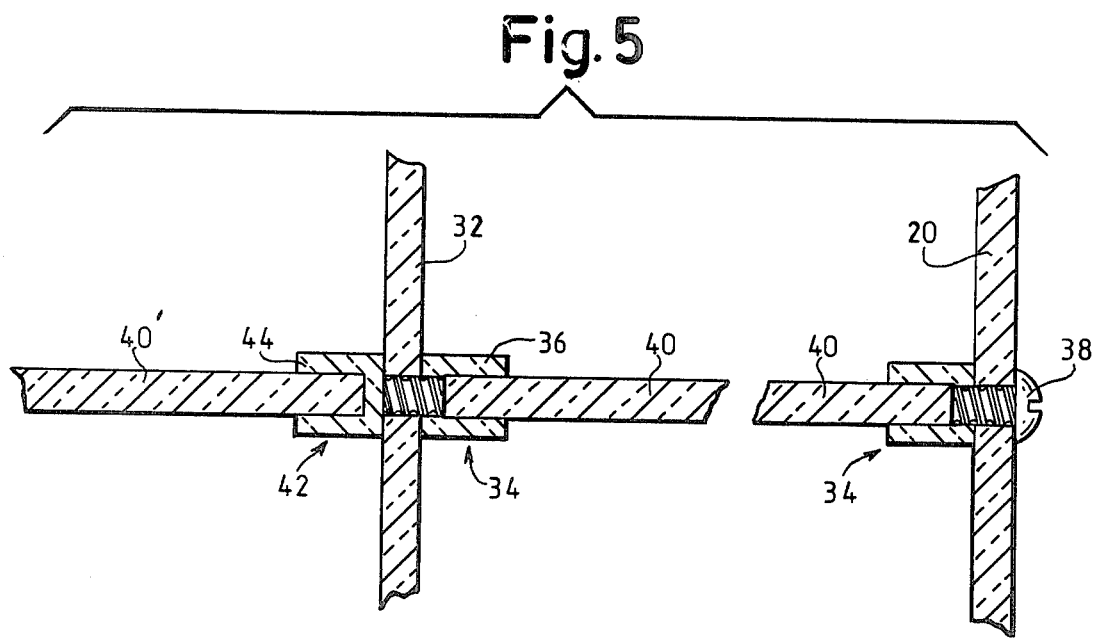

GLASS DISPLAY CASE

The present invention relates to a glass display case. More particularly, it relates to a free-standing, adjustable glass display case which may be readily assembled and disassembled.

Various types of display cases, including those made of glass, wood or metal, are of course well known and widely used for exhibiting a wide range of goods and materials. Glass display cases are particularly desired due to both their functional as well as aesthetic appeal. In addition, they provide a much more rigid and secure free-standing structure as compared to metal or wood display cases. In particular, there is relatively less sagging in the center of glass shelves as compared to conventional wood or metal display cases.

However, a major problem with present conventional glass display cases in that they are not easily adjustable and do not permit easy and facile assembly and disassembly. This is almost a necessity for modern display cases since the displays are changed quite frequently. In such cases, it is often necessary to lengthen or shorten shelves (and to accordingly move and adjust the vertical dividers employed) or to increase or decrease the number and spacing of the shelves to provide maximum and efficient use of shelf and, in turn, floor space. However, so far as is known, no presently available glass display case is as readily assembled and disassembled and as universally adjustable as the glass display case disclosed herein.

Accordingly, it is an object of the present invention to provide a novel glass display case which is adjustable, free-standing, and easy to assemble and disassemble.

It is also an object of the present invention to provide such a display case which is relatively rigid, durable, economical to fabricate and aesthetically appealing.

It is a more particular object of the present invention to provide a novel glass display case having the foregoing attributes and characteristics which is provided with a unique fastening system.

Certain of the foregoing and related objects are readily-attained in an adjustable glass display case which includes a frame composed of four glass plates: a generally horizontally-disposed top plate; a generally horizontally-disposed base plate; and two upstanding, spaced-apart side plates disposed generally between the top and bottom plates. Each of the glass plates has at least two longitudinally-extending, spaced-apart rows of holes formed therethrough. First friction-fit means are provided for detachably securing each of the plates of the frame to the other plates of the frame adjacent thereto. The case also includes a back glass plate disposed adjacent to the frame and second friction-fit means for detachably securing the back plate to the plates of the frame. In addition, at least one vertical glass divider having an upper and lower edge is positioned between and disposed generally parallel to the side plates and it too has two longitudinally-extending, spaced-apart rows of holes formed therethrough. Means are provided for detachably securing the upper and lower edges of the vertical divider to the top plate and bottom plate, respectively; the means being at least partially retained within at least one of the holes of the top and bottom plates. At least one glass shelf having opposite lateral edges is disposed between the vertical divider and one of the side plates and means are also provided for detachably securing the opposite lateral edges of the shelf to one of the side plates and the vertical divider; these means are at least partially retained within at least one of the holes of the side plate and the vertical divider.

In a preferred embodiment of the invention, the first and second friction-fit means includes a multiplicity of plastic L-shaped, resilient friction clips. Each of the clips include two perpendicular, U-shaped arms which are configured and dimensioned for frictional engagement with an edge of one of the plates.

It is also possible that the means for detachably securing the upper and lower ends of the vertical divider includes at least one pair of plastic, resilient first clamping assemblies, each of which comprises a U-shaped clamp having a base with an internally-threaded bore extending therethrough and two spaced-apart arms extending outwardly from the base which are configured and dimensioned for frictionally receiving an edge of the divider therebetween. The clamping assembly also includes a screw threadably receivable in the bore of the base of the clamp.

Most advantageously, the means for detachably securing the opposite lateral edges of the shelf includes at least one pair of plastic resilient second clamping assemblies which includes a first and second U-shaped bracket. Each of the brackets has a base and two spaced-apart arms extending outwardly from the base which are configured and dimensioned for frictionally receiving an edge of the shelf therebetween. The first U-shaped bracket has an internally-threaded bore extending through the base thereof and the second U-shaped bracket has a threaded stem secured to the base thereof which is configured and dimensioned for threaded engagement with the bore. It is also desirable to use a common back plate for two back-to-back display cases.

Certain of the foregoing and related objects are also achieved in a clamping assembly for securing one glass plate to a second glass plate having a hole formed therethrough which includes a plastic, resilient U-shaped clamp having a base with an internally threaded bore extending therethrough which is alignable with the hole of the second glass plate and two spaced-apart arms extending outwardly from said base which are configured and dimensioned for receiving an edge of the one glass plate therebetween. A screw having an enlarged head is insertable through the hole of the glass plate for threaded engagement with the bore of the base of the clamp.

Certain of the foregoing and related objects are also attained in a bracket assembly for securing the edges of two glass plates to a third plate having a hole formed therethrough, which includes a first and second U-shaped plastic, resilient bracket. Each of the brackets has a base and two spaced-apart arms extending outwardly from the base which are configured and dimensioned for receiving an edge of one of the glass plates therebetween. The base of the first bracket has an internally-threaded bore extending therethrough which is alignable with the hole of the third plate, and the base of the second bracket has a threaded stem attached thereto extending outwardly therefrom in a direction substantially opposite to the arms thereof. The stem is insertable through the hole of the third plate and for threaded engagement with the bore of the base of the first bracket.

Other objects and features of the present invention will become apparent from the following detailed description, considered in connection with the accompanying drawings, which discloses a preferred embodiment of the invention. It is to be understood, however, that the drawings are designed for the purpose of illustration only, and not as a definition of the limits of the invention.

In the drawings, wherein similar reference characters denote similar elements throughout the several views:

FIG. 2 is an enlarged, perspective view of a clamp assembly used in assembling the display case shown in FIG. 1;

FIG. 3 is an enlarged, perspective view of another clamp assembly used in assembling the display case shown in FIG. 1;

FIG. 4 is an enlarged, fragmentarily-illustrated sectional view of a portion of the display case shown in FIG. 1;

FIG. 5 is an enlarged, fragmentarily-illustrated sectional view of a further portion of the display case shown in FIG. 1.

Figure 1:
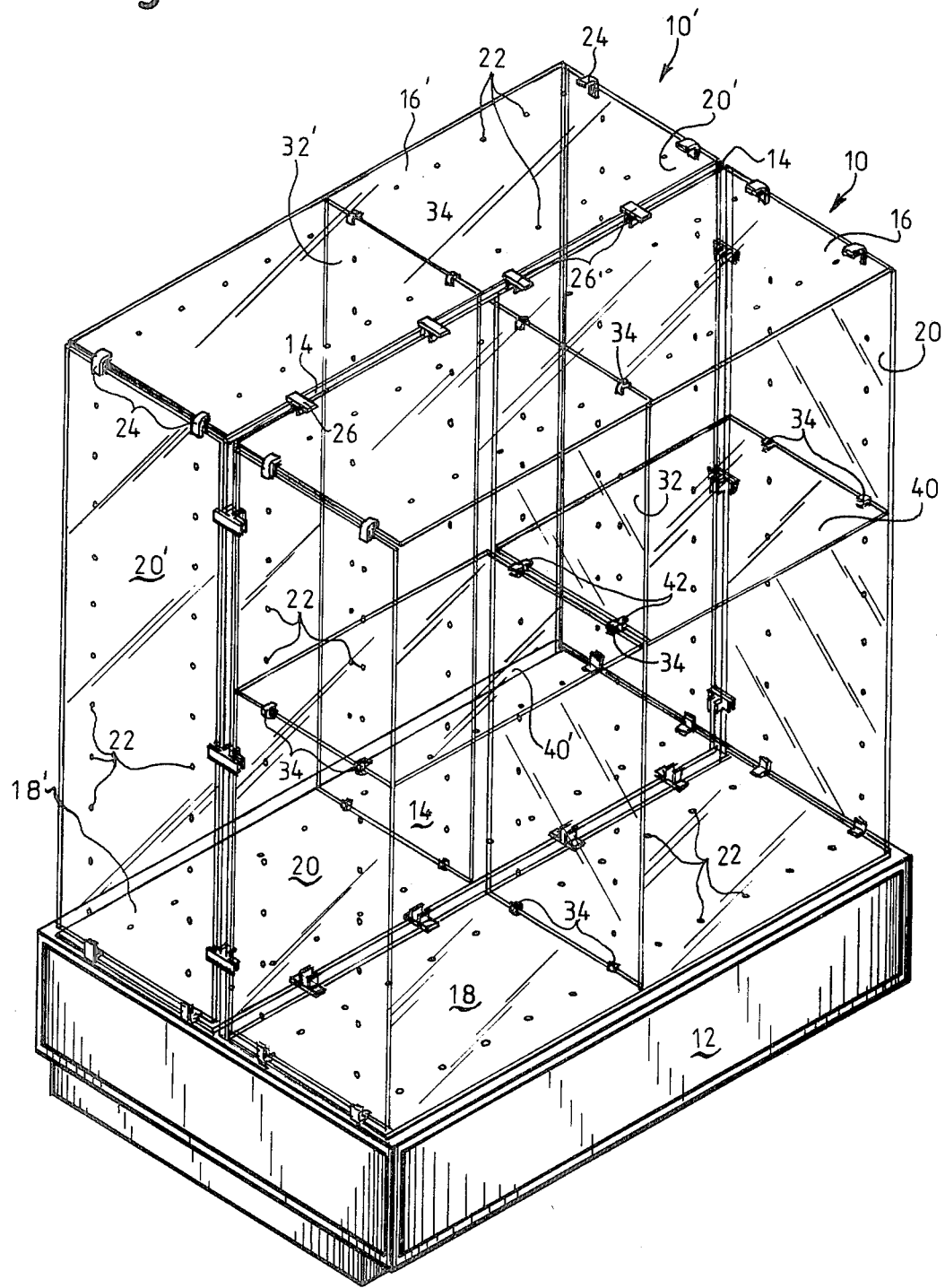
FIG. 1 is a perspective view of a novel adjustable glass display case embodying the present invention.

Turning now in detail to the drawings and, in particular, FIG. 1 thereof, therein illustrated is a novel, adjustable, free-standing glass display case embodying the present invention. The display case includes two back-to-back glass display units 10, 10' which are mounted on a common rectangular platform 12 and which share a common rectangular rigid glass back plate 14.

Each of the display units 10, 10' includes a square- or rectangular-shaped frame composed of a top glass plate 16, 16', a bottom glass plate 18, 18' and two upstanding, laterally spaced-apart glass plates 20, 20'. Each of the glass plates 16, 16', 18, 18' and 20, 20' are provided with two parallel, longitudinally-extending spaced-apart rows of holes 22 (the purpose for which will be described in greater detail hereinafter).

Figure 6:
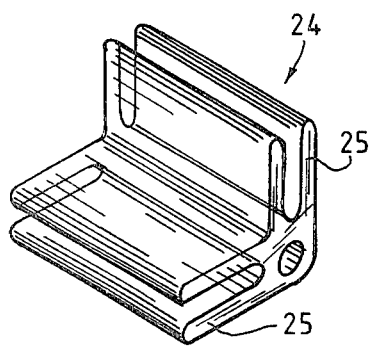
FIGS. 6-9 are enlarged, perspective views of four different resilient plastic clips which may be used in assembling the display case shown in FIG. 1.

Plates 16, 16', 18, 18' and 20, 20' are joined to one another by means of transparent, L-shaped, plastic friction clips or clamps 24 (FIG. 6). Each clip 24 has two generally U-shaped arms 25, disposed at right angles to one another, each of which is configured and dimensioned for frictional secure engagement with an edge of plates 16, 16', 18, 18' or 20, 20'. As shown in FIG. 1, two of these clips 24 are utilized to join the top edge of each of the lateral plates 20, 20' to the top plate 16, 16', and two other clips 24 are used in a similar manner to join the bottom edge of the lateral plates 20, 20' to the bottom or base plate 18, 18'.

Of course, the number of clips 24 used will depend on the dimensions of the display case and, in particular, the depth thereof. In addition, in instances where only a single display unit 10 is used, these clips 24 would also be used to join the rear lateral edges of plate 16, 18 and 20 to the back plate 14.

Figure 8:
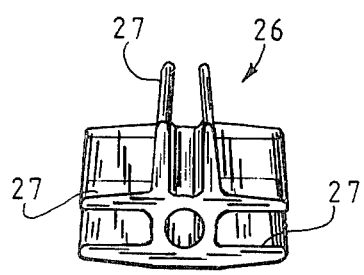

However, in the illustrated embodiment, wherein two display units 10, 10' are, in fact, employed, a plurality of transparent, T-shaped, plastic friction clips 26 (FIG. 8) are used to join the plates of each unit 10, 10' to the back plate 14. Each of the clips 26 has three U-shaped arms or prongs 27. The two arms 27 thereof which form the arms of the T are secured by means of a friction fit to the opposing and adjacent rear lateral edges of the corresponding plates 16, 16', 18, 18', and 20, 20' of each of the display units 10, 10'. The arm which forms the base or leg of the T is frictionally inserted onto the corresponding edge of the back plate 14.

Figure 7:
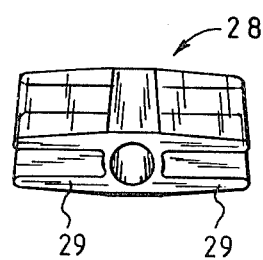
Figure 9:
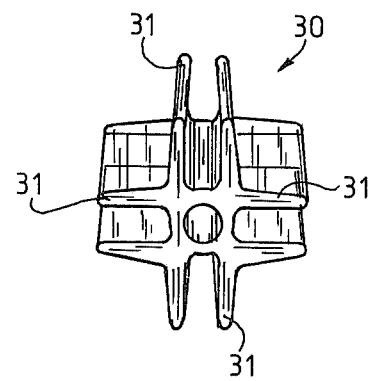

In the case where a row of single display units are employed, transparent plastic clips 28 (FIG. 7) which have two oppositely-directed arms 29 would be employed to join together the back plates 14 of adjacent units. On the other hand, in the case where a row of back-to-back display units 10, 10' are employed, X- or cross-shaped, transparent, plastic clips 30 (see FIG. 9) having four U-shaped arms 31 would be used to join together both the back plates 14 of adjacent units as well as the opposing lateral plates 20, 20' of the front and rear display units 10, 10'.

As shown in FIG. 1 and FIG. 4, each of the display units 10, 10' is divided into two side-by-side compartments by means of a vertical glass divider 32, 32' (which are also provided with two rows of holes 22). The upper and lower edges of vertical divider 32, 32' are securely clamped to top plate 16, 16' and bottom plate 18, 18' respectively, by means of transparent U-shaped plastic brackets 34 (see FIGS. 3-5).

Brackets 34 each have a base 35 and two cooperating arms 36 which grip the edge of a plate therebetween. Base 35 is provided with an internally-threaded bore 37 extending therethrough for threaded engagement with a screw 38. As shown in FIG. 4, brackets 34 are frictionally secured to the upper and lower edges of vertical divider 32 and their threaded bores 37 are then aligned respectively with one of the holes 22 in top plate 16 and bottom plate 18. Then, screws 38 are screwed into bores 37 of the associated brackets 34 from the opposite or outer side of the respective glass plates 16, 18 to secure plate 32 in place. As can be appreciated, due to the rows of holes 22, any number of vertical dividers 32 can be employed in any desired spacing.

As also shown in FIGS. 1 and 5, each of the display case compartments may contain one or several shelves 40, as desired. As shown more clearly in FIGS. 2 and 5, shelves of adjacent compartments may conveniently be supported by a common bracket assembly which includes a U-shaped bracket 34 of the aforementioned type and a second transparent, plastic, U-shaped bracket 42 which is similar in configuration to bracket 34 except for the fact that in place of bore 37 it is provided with a threaded stem or bolt 43 which is dimensioned for threaded engagement with bore 37 of bracket 34. As shown in FIG. 5, stem 43 of bracket 42 is inserted into one of the holes 22 of vertical divider 32 from one side thereof and bracket 34 is then screwed onto the stem from the other side of the vertical divider 32 until fairly tight and such that the arms 36, 44 of both brackets are generally horizontally disposed. A bracket 34 would also be inserted in a hole 22 in the side plates 20 aligned with the hole in the vertical divider 32. Then a shelf 40 could be slid, under slight pressure into the bracket channels. Typically, two brackets would be used to hold each edge of shelf 40.

As can be appreciated from the foregoing, as a result of the simple fastening system and the design of the glass plates, an infinite variety of display case designs or arrangements can be made and readily changed by the user. It should also be recognized that the various fastening clips, clamps and brackets could be used in various combinations to achieve a desired design arrangement. Finally, it should be pointed out that various modifications can be made as will be apparent to those skilled in the art.

Thus, while only a single embodiment of the present invention has been shown and described, it will be obvious that many modifications and changes may be made thereinunto, without departing from the spirit and scope of the invention.

What is claimed is:

1. An adjustable glass display case, which permits ready assembly and disassembly, comprising:
   a frame including four glass plates, a generally horizontally-disposed top plate, a generally horizontally-disposed base plate and two upstanding, spaced-apart side plates disposed generally between said top and bottom plates each of said glass plates having two longitudinally-extending, spaced-apart rows of holes formed therethrough;
   first friction-fit means for detachably securing each of said plates of said frame to the other plates of said frame adjacent thereto;
   a back glass plate disposed adjacent to said frame;
   second friction-fit means for detachably securing said back plate to said plates of said frame;
   at least one vertical glass divider having an upper and lower edge positioned between and disposed generally parallel to said side plates, said vertical divider having two longitudinally-extending, spaced-apart rows of holes formed therethrough;
   means for detachably securing the upper and lower edges of said vertical divider to said top plate and bottom plate, respectively, said means being at least partially retained within at least one of said holes of said top and bottom plates, said means for detachably securing the upper and lower ends of said vertical divider including at least one pair of plastic, resilient first clamping assemblies, each of which comprises a U-shaped clamp having a base with an internally-threaded bore extending therethrough and two spaced-apart arms extending outwardly from said base which are configured and dimensioned for frictionally receiving an edge of said divider therebetween, said clamping assembly also including a screw threadably receivable in said bore of said base of said clamp;
   at least one glass shelf having opposite lateral edges disposed between said vertical divider and one of said side plates; and
   means for detachably securing the opposite lateral edges of said shelf to one of said side plates and said vertical divider, said means being at least partially retained within at least one of said holes of said side plate and said vertical divider.

2. The display case according to claim 1, wherein said first and second friction-fit means includes a multiplicity of plastic L-shaped, resilient friction clips, each of said clips including two perpendicular, U-shaped arms each of which is configured and dimensioned for frictional engagement with an edge of one of said plates.

3. The display case according to claim 1, additionally including a second frame detachably secured to said back plate.

4. An adjustable glass display case, which permits ready assembly and disassembly, comprising:
   a frame including four glass plates, a generally horizontally-disposed top plate, a generally horizontally-disposed base plate and two upstanding, spaced-apart side plates disposed generally between said top and bottom plates, each of said glass plates having two longitudinally-extending, spaced-apart rows of holes formed therethrough;
   first friction-fit means for detachably securing each of said plates of said frame to the other plates of said frame adjacent thereto;
   a back glass plate disposed adjacent to said frame;
   second friction-fit means for detachably securing said back plate to said plates of said frame;
   at least one vertical glass divider having an upper and lower edge, positioned between and disposed generally parallel to said side plates, said vertical divider having two longitudinally-extending, spaced-apart rows of holes formed therethrough;
   means for detachably securing the upper and lower edges of said vertical divider to said top plate and bottom plate, respectively, said means being at least partially retained within at least one of said holes of said top and bottom plates;
   at least one glass shelf having opposite lateral edges disposed between said vertical divider and one of said side plates; and
   means for detachably securing the opposite lateral edges of said shelf to one of said side plates and said vertical divider, said means being at least partially retained within at least one of said holes of said side plate and said vertical divider, said means for detachably securing the opposite lateral edges of said shelf including at least one pair of plastic resilient second clamping assemblies which includes a first and second U-shaped bracket, each of which has a base and two spaced-apart arms extending outwardly from said base which are configured and dimensional for frictionally receiving an edge of said shelf therebetween, said first U-shaped bracket having an internally-threaded bore extending through the base thereof and said second U-shaped bracket having a threaded stem secured to the base thereof which is configured and dimensioned for threaded engagement with said bore.

5. The display case according to claim 4, wherein said first and second friction-fit means includes a multiplicity of plastic L-shaped, resilient friction clips, each of said clips including two perpendicular, U-shaped arms each of which is configured and dimensioned for frictional engagement with an edge of one of said plates.

6. The display case according to claim 4, additionally including a second frame detachably secured to said back plate.

* * * * *